US012474037B1

(12) United States Patent
Chen et al.

(10) Patent No.: US 12,474,037 B1
(45) Date of Patent: Nov. 18, 2025

(54) LIGHTING APPARATUS HAVING A SUPPORT ROD AND PIVOTALLY CONNECTED MOVABLE ROD WITH LAMP HEAD

(71) Applicant: Shenzhen Habitat Technology Co., Ltd, Shenzhen (CN)

(72) Inventors: Jing Chen, Shenzhen (CN); Yong Chen, Shenzhen (CN)

(73) Assignee: Shenzhen Habitat Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/280,588

(22) Filed: Jul. 25, 2025

(30) Foreign Application Priority Data

Jul. 31, 2024 (CN) ........................ 202411048402.9

(51) Int. Cl.

*F21V 21/28* (2006.01)
*F21S 6/00* (2006.01)
*F21V 21/096* (2006.01)
*F21V 21/22* (2006.01)

(52) U.S. Cl.

CPC .............. *F21V 21/28* (2013.01); *F21S 6/005* (2013.01); *F21V 21/096* (2013.01); *F21V 21/22* (2013.01)

(58) Field of Classification Search

CPC .......... F21V 21/26; F21V 21/28; F21V 21/22; F21S 6/005

See application file for complete search history.

(56) References Cited

U.S. PATENT DOCUMENTS 12,123,568 B2 * 10/2024 Kwong ................. F16M 11/38

FOREIGN PATENT DOCUMENTS

GB 2576759 A * 3/2020 ............. F21V 21/28

OTHER PUBLICATIONS

For Reference and translation (Year: 2020).*

* cited by examiner

*Primary Examiner* — Robert J May

(74) *Attorney, Agent, or Firm* — Birchwood IP

(57) ABSTRACT

The present disclosure relates to a lighting apparatus that is readily stowable. The lighting apparatus includes a support rod, a movable rod, and a lamp head. One end of the movable rod is pivotally connected to the support rod, enabling the movable rod to pivot relative to the support rod. The lamp head is connected to the other end of the movable rod. When the movable rod is pivoted to be side-by-side and adjacent to the support rod, the lamp head is configured to clasp onto the support rod to complete the stowing process of the entire lighting apparatus. The illumination height of the lamp head is flexibly adjustable through the pivoting movement of the movable rod.

20 Claims, 14 Drawing Sheets

A-A

LIGHTING APPARATUS HAVING A SUPPORT ROD AND PIVOTALLY CONNECTED MOVABLE ROD WITH LAMP HEAD

CROSS-REFERENCE TO RELATED APPLICATIONS

The present application claims priority to Chinese Invention application No. 2024110484029, filed on Jul. 31, 2024, entitled "LIGHTING APPARATUS", the entire content of which is incorporated herein by reference.

TECHNICAL FIELD

The present disclosure relates to the field of lighting technology, and more particularly, to a lighting apparatus.

BACKGROUND

Typically, a lighting apparatus, as a type of lighting appliance, has a plurality of support legs that can be switched between a stowed state and a deployed state. In the stowed state, a user can use the lighting apparatus for illumination in a handheld manner. In the deployed state, the user can place the lighting apparatus on a tabletop for illumination. However, in a conventional lighting apparatus, the light-emitting component cannot be stably maintained in a stowed state after the plurality of support legs are stowed. The light-emitting component is susceptible to shaking due to external forces, which can lead to risks such as damage and poor contact.

SUMMARY

The present disclosure aims to provide a lighting apparatus to solve the technical problem that in a conventional lighting apparatus, the light-emitting component cannot be stably maintained in a stowed state, and the light-emitting component is susceptible to shaking due to external forces, which can lead to risks such as damage and poor contact.

To solve the aforementioned technical problem, the present disclosure adopts the following technical solution:

A lighting apparatus, comprising:

- a support rod having a mounting end and a supporting end that are axially opposite to each other;
- a movable rod having a first connecting end and a second connecting end that are axially opposite to each other, wherein the first connecting end is pivotally connected to the mounting end, and when the first connecting end pivots relative to the mounting end, an included angle between the movable rod and the support rod changes, and the movable rod is pivotable to be side-by-side and adjacent to the support rod; and
- a lamp head connected to the second connecting end, the lamp head comprising a lamp housing and a light source connected to the lamp housing, wherein the lamp housing is configured to clasp onto the supporting end when the movable rod and the support rod are in a side-by-side and adjacent posture.

From the above technical solution, it can be seen that the embodiments of the present disclosure have at least the following advantages and positive effects:

The present disclosure provides a lighting apparatus wherein the movable rod can be pivoted relative to the supporting end until they are side-by-side and adjacent. At this time, the lamp head can be tightly clasped onto the supporting end to complete the stowing process of the entire lighting apparatus, and maintain the side-by-side and adjacent posture of the movable rod and the support rod. The support rod and the movable rod do not interfere with the lamp head during the relative pivoting process. The stowing process of the lighting apparatus of the present disclosure is thereby facilitated and simplified. The lighting apparatus in the stowed state allows the user to simultaneously hold the support rod and the movable rod to use it as a flashlight or a floodlight stick. When the lighting apparatus is not stowed, the entire apparatus presents an elongated rod-like structure, with the lamp head far from the supporting end. The user can hold the supporting end and use the lighting apparatus as a searchlight, or support the support rod on a supporting surface and use the lighting apparatus as a desk lamp. Therefore, the lighting apparatus provided by the present disclosure is not only convenient for stowing and carrying on the one hand, but on the other hand, the lighting apparatus can achieve different lighting functions in different states, enhancing the practicality and versatility of the lighting apparatus. Moreover, because the support rod and the movable rod are pivotally connected, the lighting orientation of the lamp head can be changed to adapt to more lighting needs of the user. Finally, after the lighting apparatus of the present disclosure is stowed, the lamp head is tightly clasped onto the supporting end. The support rod, the movable rod, and the lamp head in this solution are interconnected in sequence to form a closed frame-like structure, which greatly improves the stability of the entire lighting apparatus in the stowed state, reduces the shaking of the lamp head due to external forces, thereby protecting the lamp head.

BRIEF DESCRIPTION OF DRAWINGS

In order to illustrate the technical solutions of the embodiments of the present disclosure or of the prior art more clearly, the following drawings are briefly described as required in the context of the embodiments or the prior art. Obviously, the following drawings illustrate only some of the embodiments of the present disclosure. Other relevant drawings may be obtained on the basis of the shown structures of these drawings without any creative effort by those skilled in the art.

Figure 1:
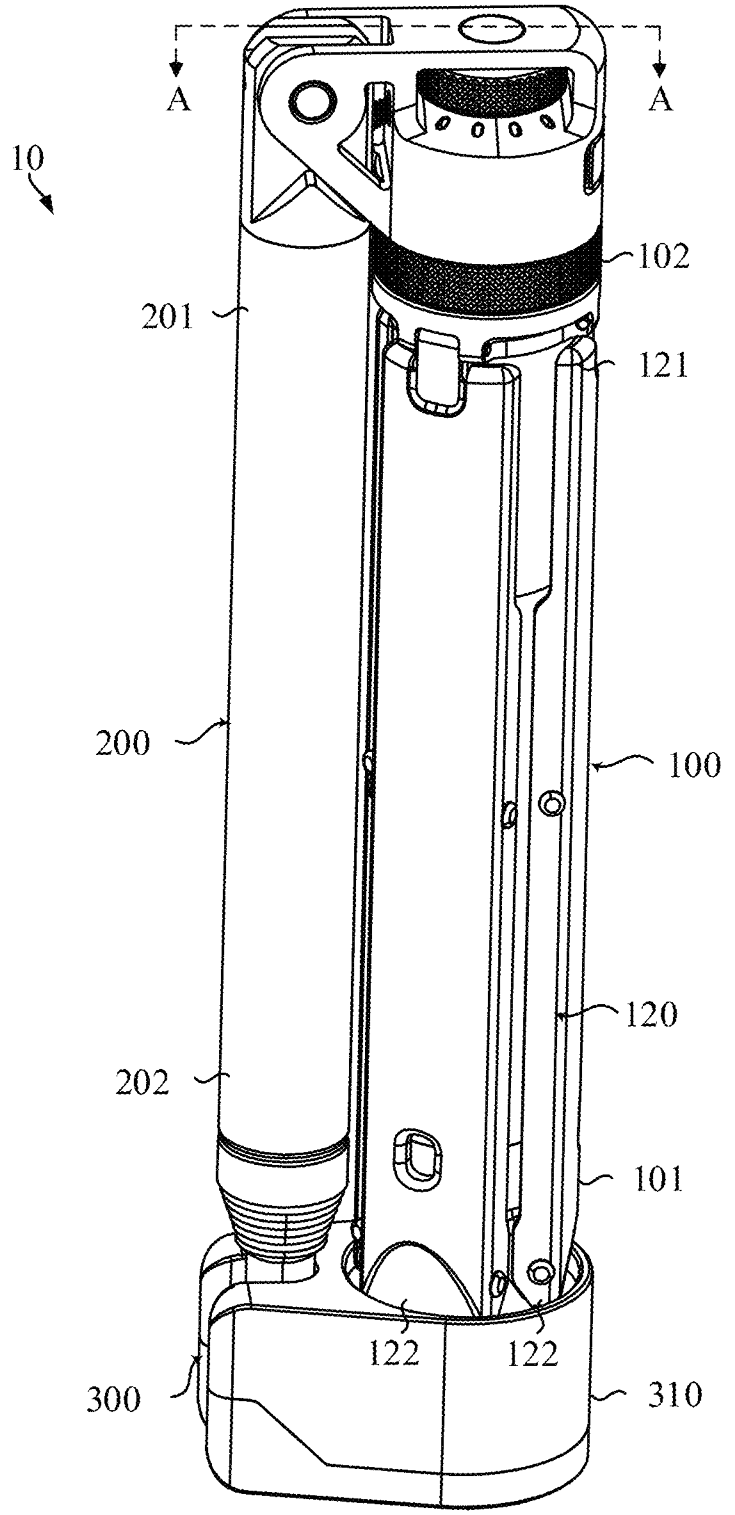
FIG. 1 is a structural schematic view of a lighting apparatus in a stowed state according to an embodiment of the present disclosure.

Reference numerals are as follows:

10: lighting apparatus; 100: support rod; 101: supporting end; 102: mounting end; 110: rod body; 120: leg; 121: pivoting end; 122: fixing end; 123: magnet; 131: first lug; 132: second lug; 133: clearance region; 200: movable rod; 201: first connecting end; 202: second connecting end; 210: fixed rod; 220: telescopic rod; 230: adapter; 300: lamp head; 310: lamp housing; 311: first end face; 312: second end face; 320: light source; 321: flood lamp; 322: spot lamp; 330: mounting groove; 331: first mounting groove; 332: second mounting groove; 410: first rotation axis; 420: second rotation axis; 430: third rotation axis; 500: battery; 600: conductive wire.

DESCRIPTION OF EMBODIMENTS

Typical embodiments reflecting features and advantages of the present disclosure will be described in detail in the following description. It should be understood that the present disclosure may admit to various modifications in different embodiments without departing from the scope of the present disclosure. The descriptions and drawings therein are substantially illustrative in nature rather than restrictive of the present disclosure.

Furthermore, the related terms "first", and "second" are used for descriptive purposes only and are not to be understood as indicating or implying relative importance or implicitly specifying the number of technical features indicated. Thus, features defined as "first" or "second" may explicitly or implicitly include one or more of such features. In the description of the present application, the term "a plurality of" means two or more unless otherwise expressly specified.

In the description of the present application, it should be noted that terms such as "installed," "provided," and "connected" should be broadly understood unless otherwise expressly defined and limited. For example, a connection may be a fixed connection, a detachable connection, or an integral connection; may be a mechanical connection or an electrical connection; may be a direct connection or an indirect connection through an intermediate medium; and may be communication between interiors of two components. Those of ordinary skill in the art may understand the specific meanings of the above terms in the present disclosure based on practical contexts.

Figure 2:
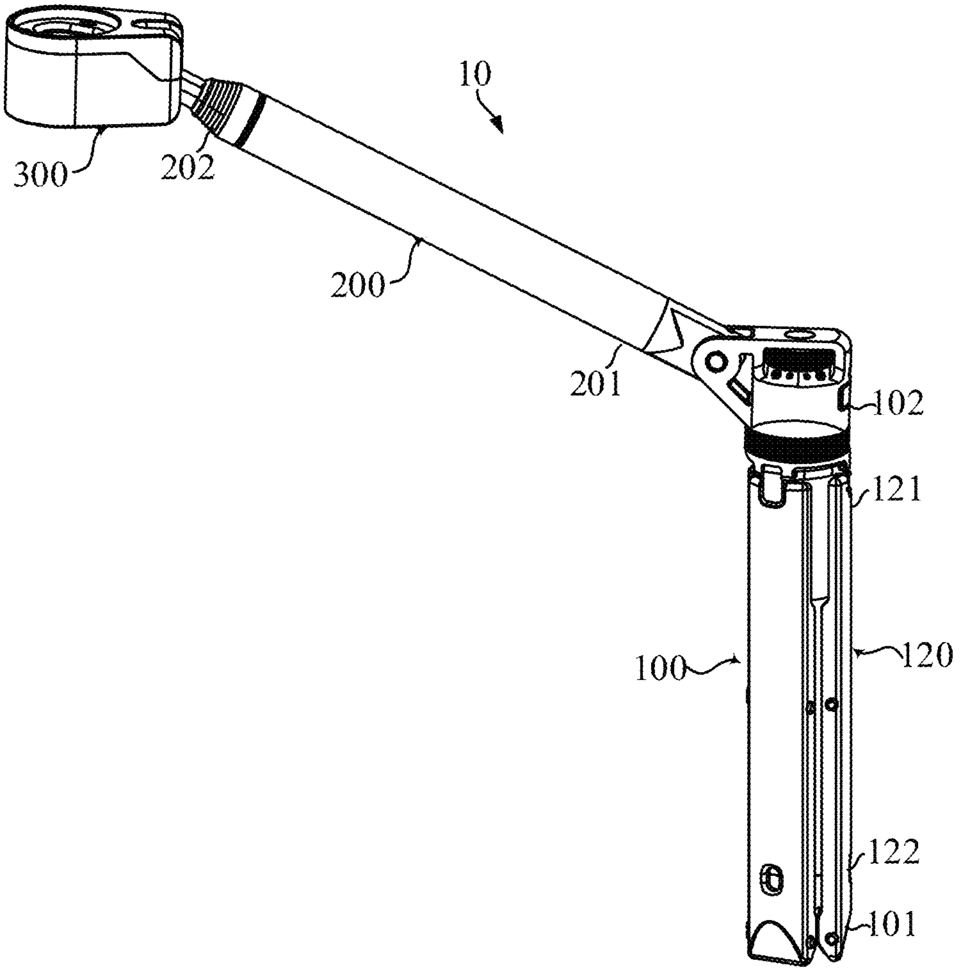
FIG. 2 is a structural schematic view of the lighting apparatus of FIG. 1 after the movable rod is switched to a deployed state.

With reference to FIG. 1 and FIG. 2, the present application provides a lighting apparatus 10 that is readily stowable. The lighting apparatus 10 can be switched between a deployed state and a stowed state. FIG. 1 illustrates the lighting apparatus 10 in a stowed state. In this state, the lighting apparatus 10 can be held by a user for portable use and to provide a lighting function. For example, the user can hold the lighting apparatus to obtain illumination, which is convenient for the user's activities at night. At the same time, when the lighting apparatus 10 is in the stowed state, its volume and occupied space are small, which facilitates the stowing and carrying for the user. FIG. 2 illustrates the lighting apparatus 10 in a deployed state. In the deployed state, the lighting apparatus 10 has a greater illumination height and a larger illumination range. At this time, the lighting apparatus 10 is configured to be handheld to provide lighting for a large area of moving space during outdoor camping, and use it as a mobile road light or a searchlight during night travel, which not only facilitates road guidance but also allows the user to observe the surrounding environment. Alternatively, referring to FIG. 3, in other use scenarios, the lighting apparatus 10 can be further deployed into a stand state, so that the lighting apparatus 10 can be placed on a flat or uneven supporting surface to provide a lighting function. For example, when reading a book or looking at a computer at night, appropriate lighting is needed to protect the eyes from damage due to strong light. At this time, the lighting apparatus 10 can be supported on a tabletop to be used as a desk lamp. It should be understood that, in the present application, the lighting apparatus 10 may not be deployed into a stand state, provided that the lighting apparatus can be stowed. In addition, when the support body of the lighting apparatus 10 is sufficiently robust, the user can also directly support the deployed lighting apparatus 10 on a supporting surface.

With reference to FIG. 1 and FIG. 2, the lighting apparatus 10 includes a support rod 100, a movable rod 200, and a lamp head 300 connected in sequence. The lamp head 300 is connected to a free end of the movable rod 200. The movable rod 200 performs a pivoting movement relative to the support rod 100, enabling the entire lighting apparatus 10 to be selectively switched between the deployed state and the stowed state.

Specifically, the support rod 100, as a supporting body, has a supporting end 101 and a mounting end 102 that are opposite to each other. When the lighting apparatus 10 is in the deployed state, the support rod 100 can support the lighting apparatus 10 on a supporting surface. The movable rod 200 has a first connecting end 201 and a second connecting end 202 that are opposite to each other. The first connecting end 201 is pivotally connected to the mounting end 102. When the first connecting end 201 pivots relative to the mounting end 102, the included angle between the movable rod 200 and the support rod 100 changes, and the movable rod 200 can be pivoted until it is side-by-side and adjacent to the support rod 100. At this time, the movable rod 200 is stowed on a side of the support rod 100, whereby the lighting apparatus 10 is switched from the deployed state to the stowed state. The lamp head 300, as the light-emitting component of the lighting apparatus 10, emits illumination light to provide a light source for the user. The lamp head 300 is connected to the second connecting end 202. The lamp head 300 includes a lamp housing 310 and a light source 320 disposed within the lamp housing 310. The lamp housing 310 protects the light source 320 from damage from external impact. As shown in FIG. 1, when the lighting apparatus 10 is in the stowed state, that is, when the movable rod 200 and the support rod 100 are in a side-by-side and adjacent posture, the lamp housing 310 clasps onto the supporting end 101 of the support rod 100. As used herein, the term "clasping" means a close engagement between the two, which can be achieved by an engagement mechanism, such as a snap-fit, a hook, an adhesive, or a magnet. The lamp housing 310 clasps onto the supporting end 101, which includes, but is not limited to, the lamp housing 310 clasping onto the side periphery, edge, or bottom of the supporting end 101.

Figure 3:
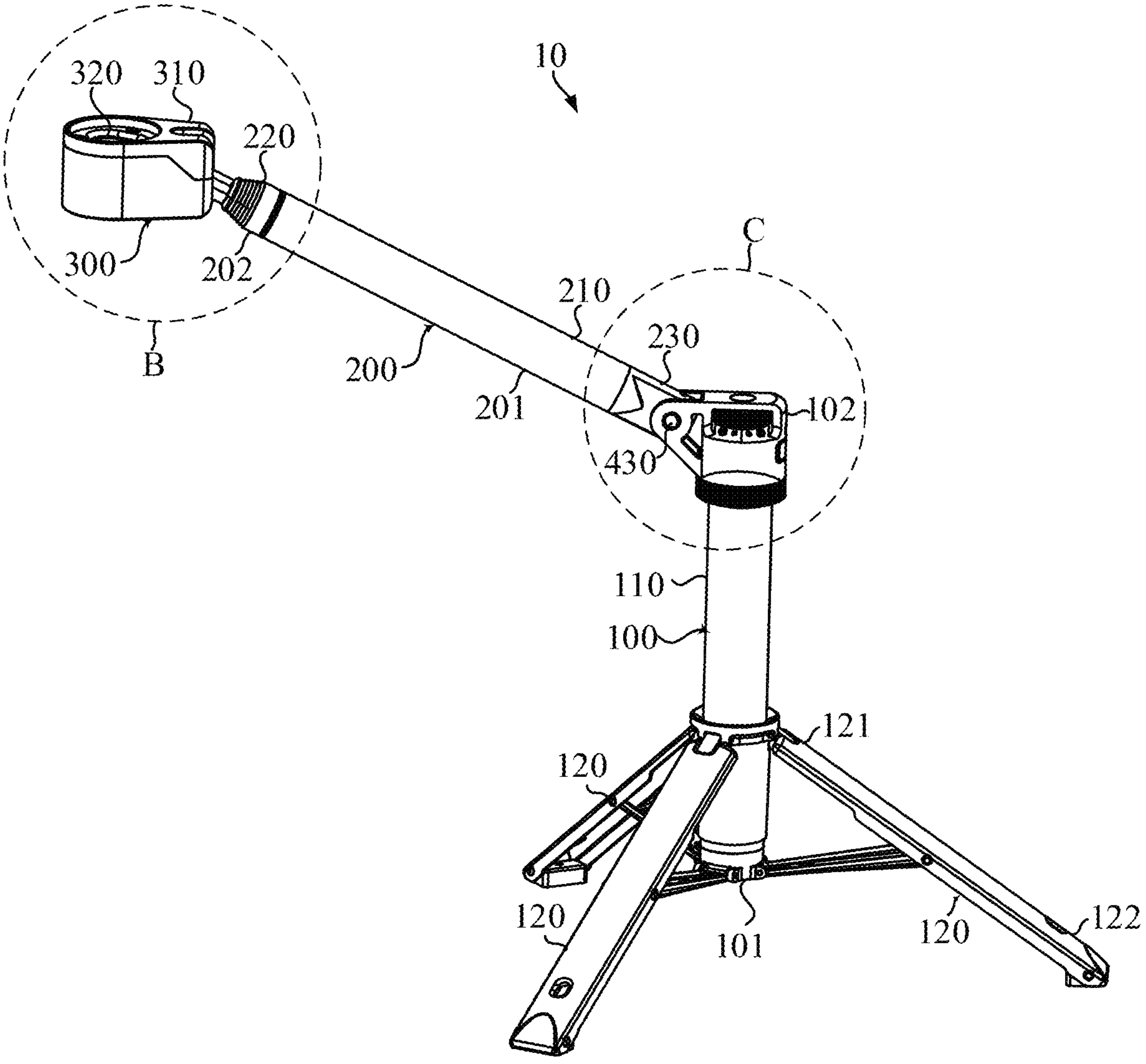
FIG. 3 is a structural schematic view of the lighting apparatus of FIG. 2 after the support rod is switched to a deployed state.

Specifically, referring to FIG. 3, when using the lighting apparatus 10, the user can apply an external force to the support rod 100, causing the support rod 100 to deploy. When the support rod 100 is in the deployed state, the support rod 100 presents a tripod structure. At this time, the deployed lighting apparatus 10 can be placed on the aforementioned flat or uneven supporting surface. The lighting apparatus 10 serves as a desk lamp to provide a lighting function. At this time, the support rod 100 provides a supporting and fixing function for the movable rod 200 and the lamp head 300. When the lighting apparatus 10 is placed on the supporting surface via the tripod structure, the movable rod 200 can pivot relative to the support rod 100 to change the illumination height, and the movable rod 200 can also rotate circumferentially about the central axis of the support rod 100 to change the circumferential orientation of the illumination, satisfying different lighting needs of the user. When the movable rod 200 rotates circumferentially to an arbitrary angular orientation relative to the support rod 100, and the movable rod 200 is stowed by pivoting, the lamp head 300 disposed at the free end of the movable rod 200 can always be directly clasped onto the supporting end 101. This means that, in the actual use process, regardless of how the illumination angular orientation of the lamp head 300 is adjusted, the user can directly complete the clasping of the lamp head 300 at the supporting end 101 by performing a pivoting movement of the movable rod 200, without necessarily having to pivot the movable rod 200 to a fixed orientation first. This greatly simplifies the stowing operation of the lighting apparatus 10 and shortens the time for the user to complete the stowing and clasping of the lighting apparatus 10. In addition, it should be explained that, in other embodiments, the movable rod 200 can also be configured to be non-rotatable circumferentially relative to the support rod 100. In such embodiments, the circumferential angle adjustment of the movable rod 200 may not be essential.

More specifically, in this embodiment, with reference to FIG. 2 and FIG. 3, the support rod 100 includes a rod body 110 and a plurality of legs 120 connected therewith. The two axially opposite ends of the rod body 110 correspond to the aforementioned supporting end 101 and mounting end 102, respectively. The plurality of legs 120, as supporting members, can be switched between a retracted state and a deployed state. Each leg 120 has a pivoting end 121 and a fixing end 122 that are opposite to each other. The pivoting end 121 is pivotally connected to a side periphery of the rod body 110. When the pivoting end 121 pivots outwardly relative to the rod body 110, it simultaneously drives the plurality of fixing ends 122 to switch from a retracted state wherein the fixing ends 122 are positioned proximate to each other to a deployed state wherein the fixing ends are spaced apart from each other. The plurality of legs 120 switch from the retracted state (shown in FIG. 2) to the deployed state (shown in FIG. 3), which is the aforementioned tripod deployed state. When the plurality of legs 120 are in the retracted state, the plurality of legs 120 are side-by-side and adjacent to the side periphery of the rod body 110 and surround it. In this state, the user can also continue to operate by pivoting the movable rod 200 to a stowed position until the movable rod 200 and the support rod 100 are in a side-by-side and adjacent posture, that is, the stowed state of the lighting apparatus 10 shown in FIG. 1. The user can simultaneously hold the support rod 100 and the movable rod 200 to use the lighting apparatus 10 as a flashlight for illumination.

It should be understood that, firstly, the plurality of legs 120 add a supporting function to the support rod 100. In other embodiments, when the radial dimension of the support rod 100 is sufficiently large, and the end face of the supporting end 101 has a large and flat area, at this time, the support rod 100 can be directly supported on a supporting surface via the end face of the supporting end 101, and there is no need to additionally provide the plurality of legs 120 to enable the support rod 100 to achieve the support function of a stand. Secondly, the deploying method of the plurality of legs 120 can be the legs 120 pivoting outward relative to the outer side wall of the rod body 110 as in this embodiment. Alternatively, in other embodiments, the plurality of legs 120 can be switched from the retracted state to the deployed state by rotating circumferentially about the rod body 110.

Preferably, the external shape structure of the support rod 100 is cylindrical. The cylindrical shape of the support rod 100 can improve user comfort during handheld use when the lighting apparatus 10 is in the stowed state for portable illumination. Additionally, a cylindrical shape is often easier to manufacture. It should be understood that, in other embodiments, where other design factors take priority over holding comfort or manufacturing ease, the external shape structure of the support rod 100 can also be an ellipsoid, a triangular prism, a quadrangular prism, etc., that is, the present application does not impose any limitation on the shape of the support rod 100.

Figure 4:
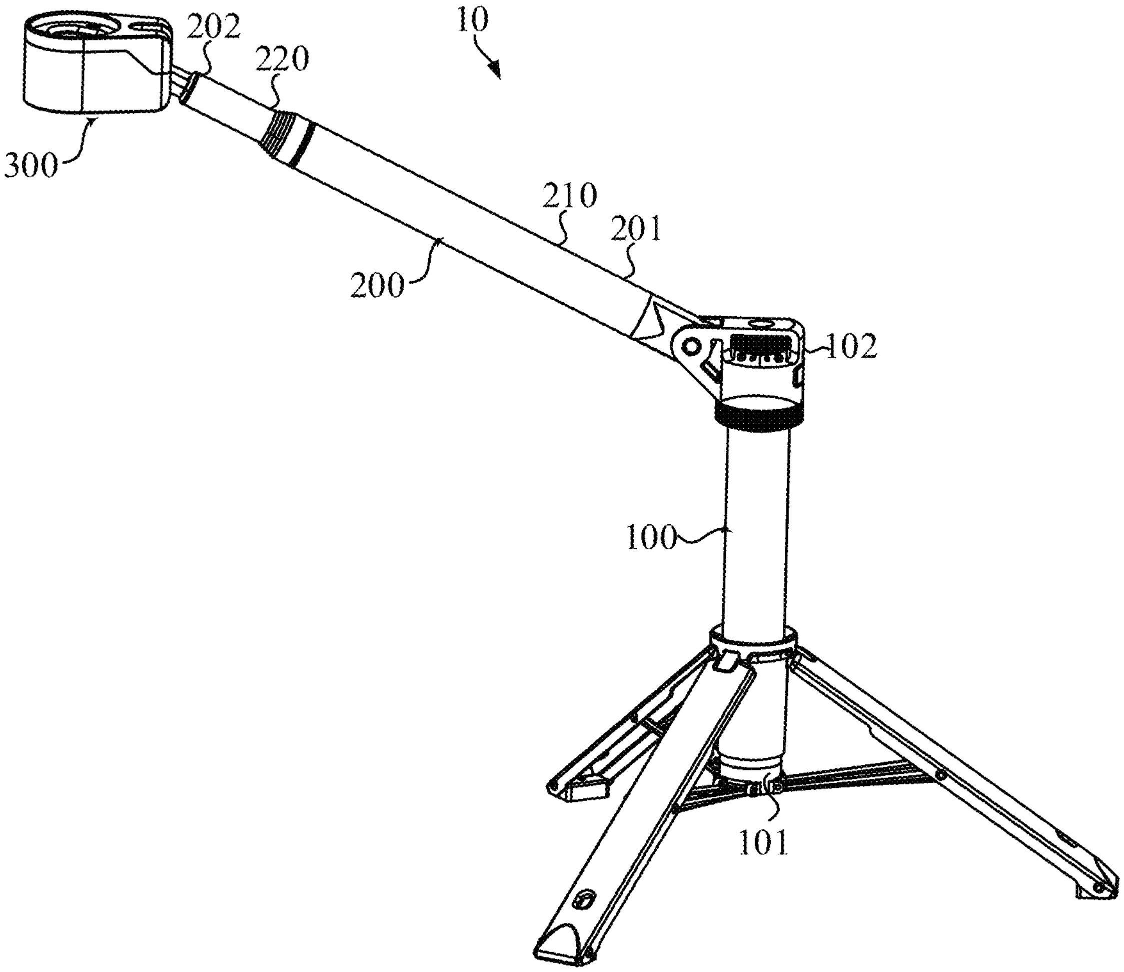
FIG. 4 is a structural schematic view of the lighting apparatus of FIG. 3 after the movable rod is extended.

Preferably, in this embodiment, with reference to FIG. 3 and FIG. 4, the movable rod 200 includes a connected fixed rod 210 and a telescopic rod 220. The fixed rod 210 is pivotally connected to the mounting end 102 at the first connecting end 201. The telescopic rod 220 is connected to the lamp housing 310 at the second connecting end 202. The telescopic rod 220 is telescopically sleeved with the fixed rod 210. The telescopic rod 220 can reciprocate axially relative to the fixed rod 210, so that the movable rod 200 can be extended or retracted to change its length, thereby changing the distance between the lamp head 300 and the support rod 100. It should be understood that, firstly, the fixed rod 210 and the telescopic rod 220 are relative concepts, representing two tubular members that are connected end-to-end and can be telescopically moved relative to each other. Alternatively, in other embodiments, the fixed rod 210 is connected to the lamp housing 310 at the second connecting end 202, and the telescopic rod 220 is pivotally connected to the mounting end 102 at the first connecting end 201. Secondly, the number of telescopic rods 220 can be one or more. The more numerous they are, the larger the telescoping range. The telescopic rods 220 are generally sleeved sequentially according to the radial size of the tubular members. Small-sized tubular members can be telescopically concealed within or extended out from large-sized tubular members. In this embodiment, there are multiple telescopic rods 220, wherein the multiple telescopic rods 220 are sleeved one within another, and their radial sizes sequentially decrease from an innermost rod to an outermost rod, and are all smaller than the radial size of the fixed rod 210. This allows the telescopic rods 220 to be concealed within the fixed rod 210.

With reference to FIG. 3 and FIG. 4, when the lighting apparatus 10 is in the deployed state, and the included angle between the axis of the movable rod 200 and the support rod 100 is fixed, the movable rod 200 can change its length by means of the telescopic movement, thereby changing the distance between the first connecting end 201 and the second connecting end 202, and thus changing the distance between the support rod 100 and the lamp head 300, thereby changing the near-far orientation of the illumination of the lamp head 300.

Figure 5:
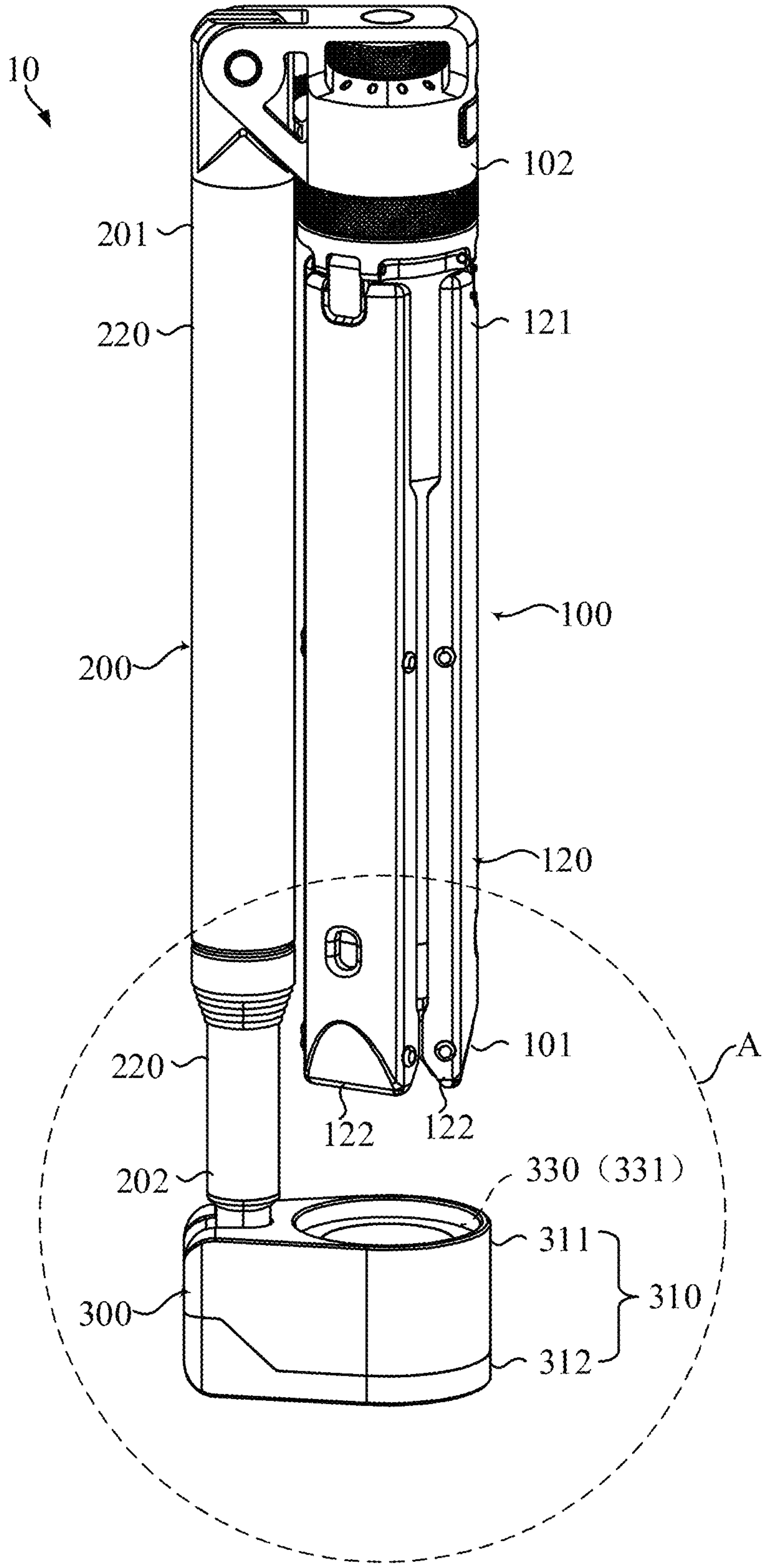
FIG. 5 is a structural schematic view of the lighting apparatus of FIG. 1 after the movable rod is extended.

With reference to FIG. 1 and FIG. 5, when the lighting apparatus 10 is in the stowed state, the lamp head 300 moves closer to or farther from the supporting end 101 along with the telescopic movement of the movable rod 200. The lamp head 300 can simultaneously clasp onto the bottom portion of the supporting end 101 and the bottom portions of the fixing ends 122 of the plurality of legs 120.

Figure 6:
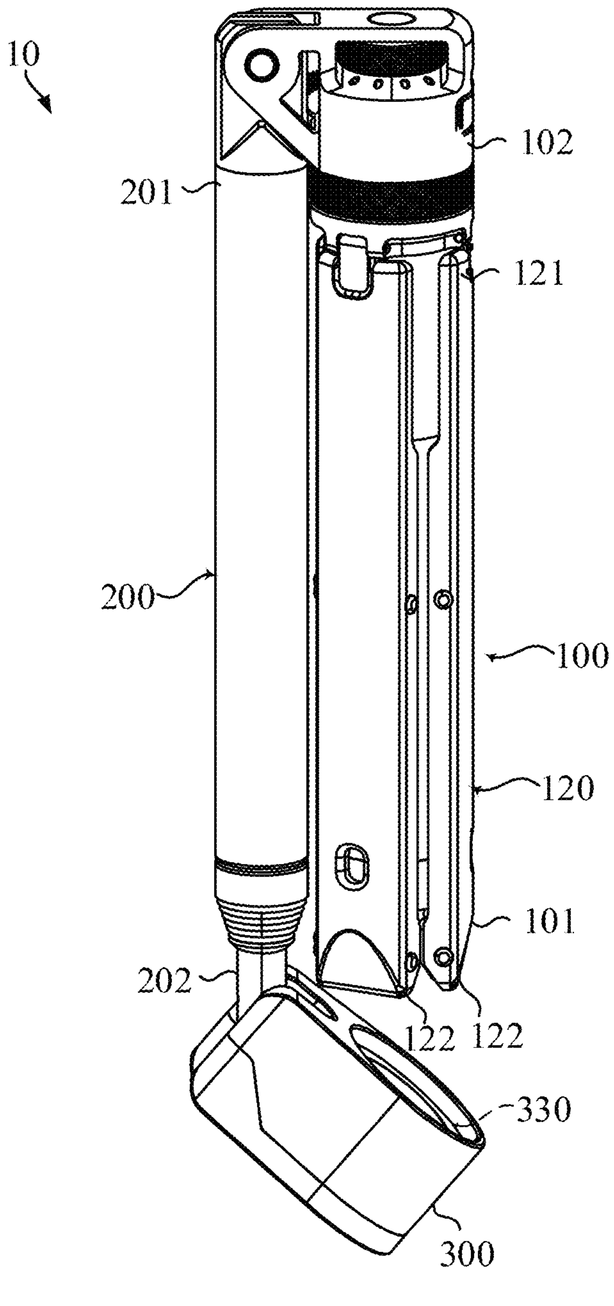
FIG. 6 is a structural schematic view of the lighting apparatus of FIG. 1 after the lamp head pivots.

Preferably, with reference to FIG. 1 and FIG. 6, in this embodiment, the lamp head 300 is pivotally connected to the second connecting end 202 to achieve the pivoting of the lamp head 300. The lamp head 300 pivots axially along the movable rod 200 to achieve the pivoting relative to the second connecting end 202. When the movable rod 200 and the support rod 100 are in the side-by-side and adjacent posture, the lamp housing 310 is pivoted to drive the lamp head 300 to rotate synchronously to simultaneously clasp onto the bottom portion of the supporting end 101 and the bottom portions of the fixing ends 122 of the plurality of legs 120.

With reference to FIG. 5 and FIG. 6, the lamp head 300 in this embodiment can both move closer to or farther from the support rod 100 via the movable rod 200, and can also pivot relative to the movable rod 200 by being pivotally connected to the movable rod 200, thereby flexibly changing the illumination orientation. It should be understood that, in other embodiments of the present application, the lamp head 300 may be detachably connected to the movable rod 200. A user can detach the lamp head 300 from the second connecting end 202 according to the required illumination orientation, and after the movable rod 200 is arbitrarily pivoted and telescoped to adjust the target illumination orientation, the user can then install the lamp head 300 onto the second connecting end 202. On the other hand, a detachable lamp head 300 can be stowed and protected separately, and different models of lamp heads 300 can be replaced at any time according to usage needs. Different models of lamp heads 300 may have different shapes, different light-emitting colors, different light-emitting powers, and so on. Of course, in other embodiments, the lamp head 300 is non-detachably connected to the second connecting end 202, and the user can also achieve the adjustment of different illumination orientations of the lamp head 300 through operations such as pivoting and telescoping. Therefore, in the present application, whether the lamp head 300 is detachably connected to the second connecting end 202 is not limited.

It should be understood that, in other embodiments, on the one hand, the lamp head 300 cannot pivot relative to the movable rod 200. When the first connecting end 201 of the movable rod 200 is pivoted relative to the mounting end 102 until the movable rod 200 and the support rod 100 are in the side-by-side and adjacent posture, the second connecting end 202 of the movable rod 200 moves closer to or farther from the supporting end 101 via the telescoping of the movable rod 200, and at the same time drives the lamp head 300 to move closer to or farther from the supporting end 101. The clasping surface of the lamp head 300 faces the supporting end 101, so that the lamp head 300 can be clasped onto the bottom portion of the supporting end 101 merely by the telescoping of the movable rod 200. On the other hand, the movable rod 200 is not telescopic. When the first connecting end 201 of the movable rod 200 is pivoted relative to the mounting end 102 until the movable rod 200 and the support rod 100 are in the side-by-side and adjacent posture, at this time, the clasping of the lamp head 300 onto the bottom portion of the supporting end 101 can be achieved merely by pivoting the lamp head 300, and at the same time, the fixing ends 122 of the plurality of legs 120 are simultaneously clasped into the lamp head 300.

Figure 7:
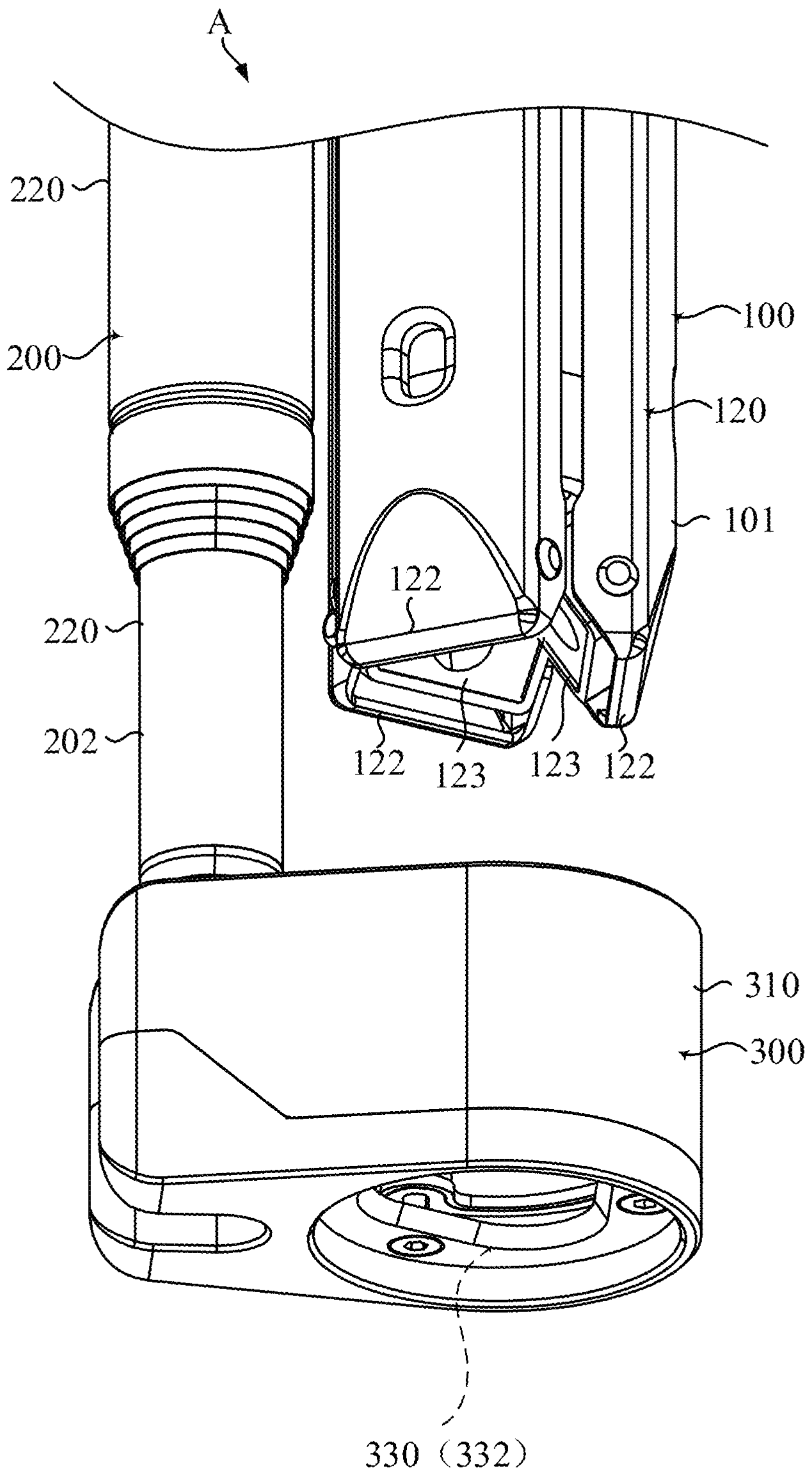
FIG. 7 is a partial enlarged structural view of portion A in the lighting apparatus of FIG. 5.

Preferably, with reference to FIG. 6 or FIG. 7, a clasping surface of the lamp housing 310 is provided with a mounting groove 330, and the fixing ends 122 of the plurality of legs 120 are fitted into the mounting groove 330 (as shown in FIG. 1), so that the lamp housing 310 clasps onto the bottom portion of the supporting end 101. The lighting apparatus 10, by means of the clasping between the mounting groove 330 and the supporting end 101 (including the plurality of fixing ends 122), on the one hand, maintains the stowed posture of the entire lighting apparatus 10, and on the other hand, prevents the plurality of fixing ends 122 from deploying away from each other, thereby maintaining the retracted state of the plurality of legs 120. When the lighting apparatus 10 is in the stowed state, during use by the user, the lighting apparatus 10 is not easily deployed. Referring to FIG. 7, each fixing end 122 of the plurality of legs 120 is provided with a magnet 123. The fixing end 122 can be magnetically attracted to the lamp head 300 via the magnet 123, to achieve the clasping of the lamp head 300 onto the bottom portion of the supporting end 101, that is, to clasp onto the plurality of fixing ends 122 to maintain the retracted state of the plurality of legs 120. It should be understood that, the aforementioned clasping refers to a tight engagement. This embodiment achieves the clasping of the lamp head 300 onto the supporting end 101 by means of the mounting groove 330 or the magnet 123, or by the combined action of the mounting groove 330 and the magnet 123. In other embodiments of the present application, the lamp housing 310 does not need to be provided with the mounting groove 330. The clasping of the lamp head 300 onto the bottom portion of the supporting end 101 can also be achieved by providing matching snap-fits, snap hooks, Velcro, magnets, etc., on the clasping surface of the lamp housing 310 and the bottom portion of the supporting end 101.

The present disclosure provides a lighting apparatus 10, comprising three parts: a support rod 100, a movable rod 200, and a lamp head 300. The support rod 100 has a supporting end 101 and a mounting end 102 that are opposite to each other. One end of the movable rod 200 is pivotally connected to the mounting end 102, and the other end is connected to the lamp head 300. The movable rod 200 can be pivoted relative to the supporting end 101 until the movable rod 200 and the support rod 100 are side-by-side and adjacent. At this time, the lamp head 300 can be simultaneously and tightly clasped onto the supporting end 101 to complete the stowing process of the entire lighting apparatus 10, and maintain the side-by-side and adjacent posture of the movable rod 200 and the support rod 100. The support rod 100 and the movable rod 200 do not interfere with the lamp head 300 during the relative pivoting process. The stowing process of the lighting apparatus 10 of the present disclosure is convenient and simple to operate. The lighting apparatus in the stowed state allows the user to simultaneously hold the support rod 100 and the movable rod 200 to use it as a flashlight or a floodlight stick. When the lighting apparatus 10 is not stowed, the support rod 100 can support the lighting apparatus 10 on a supporting surface, and the user can use it as a desk lamp. Therefore, the lighting apparatus 10 provided by the present disclosure is not only convenient to stow and carry for the user on the one hand, but on the other hand, the lighting apparatus 10 can achieve different lighting functions in different states, enhancing the practicality and versatility of the lighting apparatus 10. Moreover, because the support rod 100 and the movable rod 200 are pivotally connected, the lighting orientation of the lamp head 300 can be changed to adapt to more lighting needs of the user. Finally, after the lighting apparatus 10 of the present disclosure is stowed, the lamp head 300 is tightly clasped onto the supporting end 101. The support rod 100, movable rod 200, and lamp head 300 in this solution form a closed frame-type structure from head to tail, which greatly improves the stability of the entire lighting apparatus 10 in the stowed state, reduces the shaking of the lamp head 300 due to external forces, thereby protecting the lamp head 300.

Figure 8:
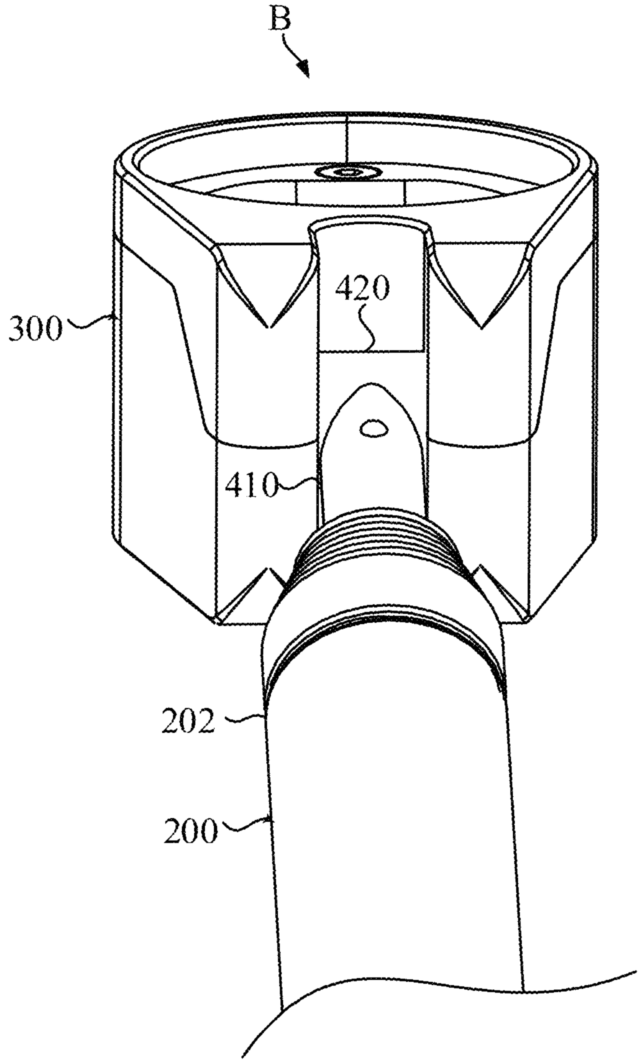
FIG. 8 is a partial enlarged structural view of portion B in the lighting apparatus of FIG. 3.
Figure 9:
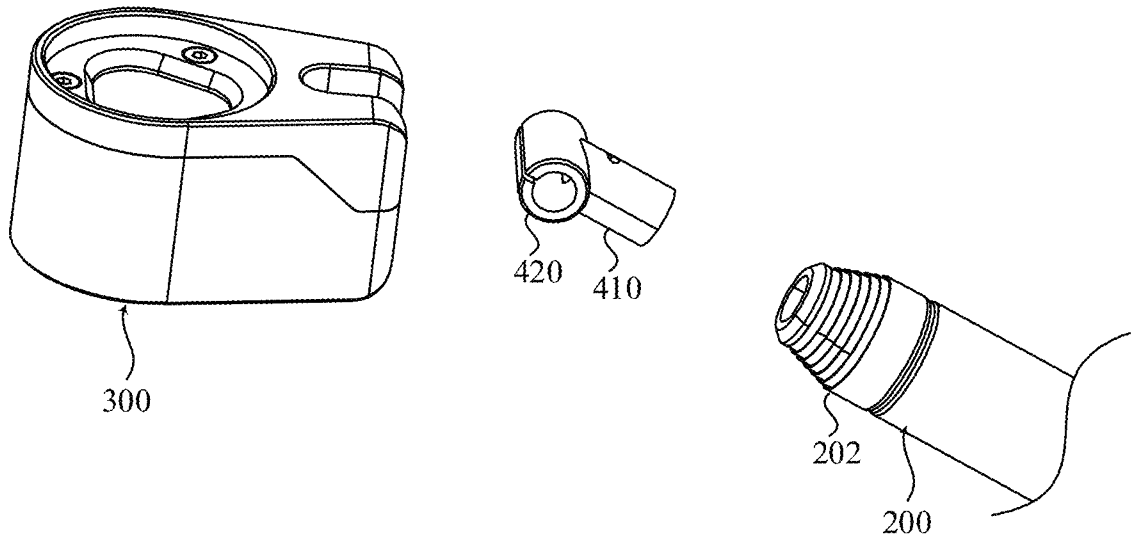
FIG. 9 is an exploded structural view of the connection between the lamp head and the movable rod shown in FIG. 8.

Preferably, in this embodiment, with reference to FIG. 8 and FIG. 9, at the second connecting end 202, the lamp head 300 is configured to rotate circumferentially about a first rotation axis 410, and to perform a pivoting movement about a second rotation axis 420. The first rotation axis 410 and the second rotation axis 420 are perpendicular to each other. The second rotation axis 420 is perpendicular to the axis of the second connecting end 202. The first rotation axis 410 and the second rotation axis 420 constitute a T-shaped shaft. The lamp head 300 is pivotally connected to the second connecting end 202 of the movable rod 200 via the T-shaped shaft. The above design allows for flexible adjustment of the lighting orientation of the lamp head 300. It should be understood that the first rotation axis 410 and the second rotation axis 420 can be the aforementioned T-shaped shaft; at this time, the first rotation axis 410 and the second rotation axis 420 should be understood as physical shafts. In other embodiments, the first rotation axis 410 and the second rotation axis 420 can also be virtual axes. The so-called "virtual axis" refers to a non-existent axis that is artificially defined to facilitate the determination of the rotational orientation. For example, at this time, the lamp head 300 is connected to the movable rod 200 via a universal ball joint.

Figure 10:
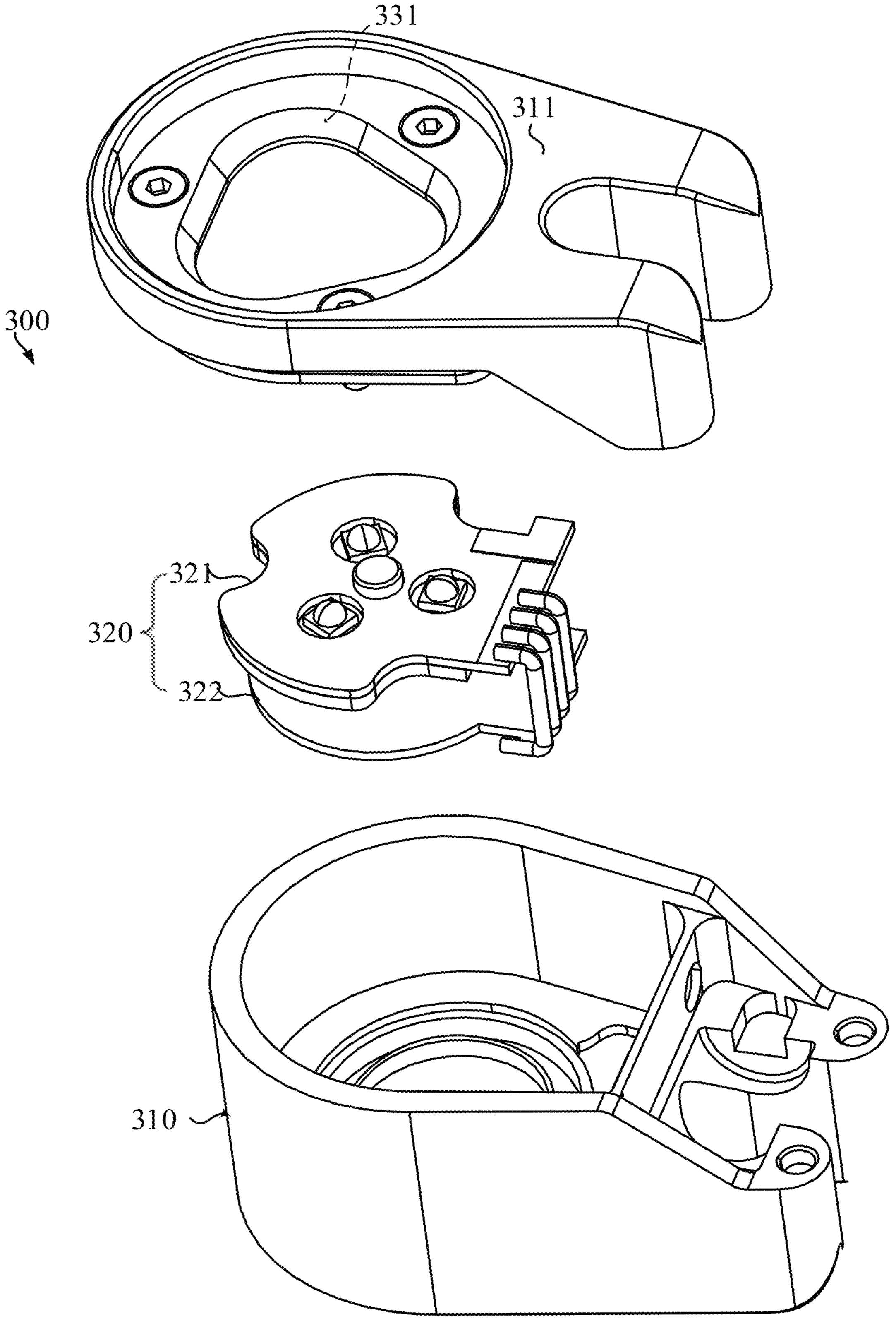
FIG. 10 is an exploded structural view of the lamp head shown in FIG. 9 from one perspective.
Figure 11:
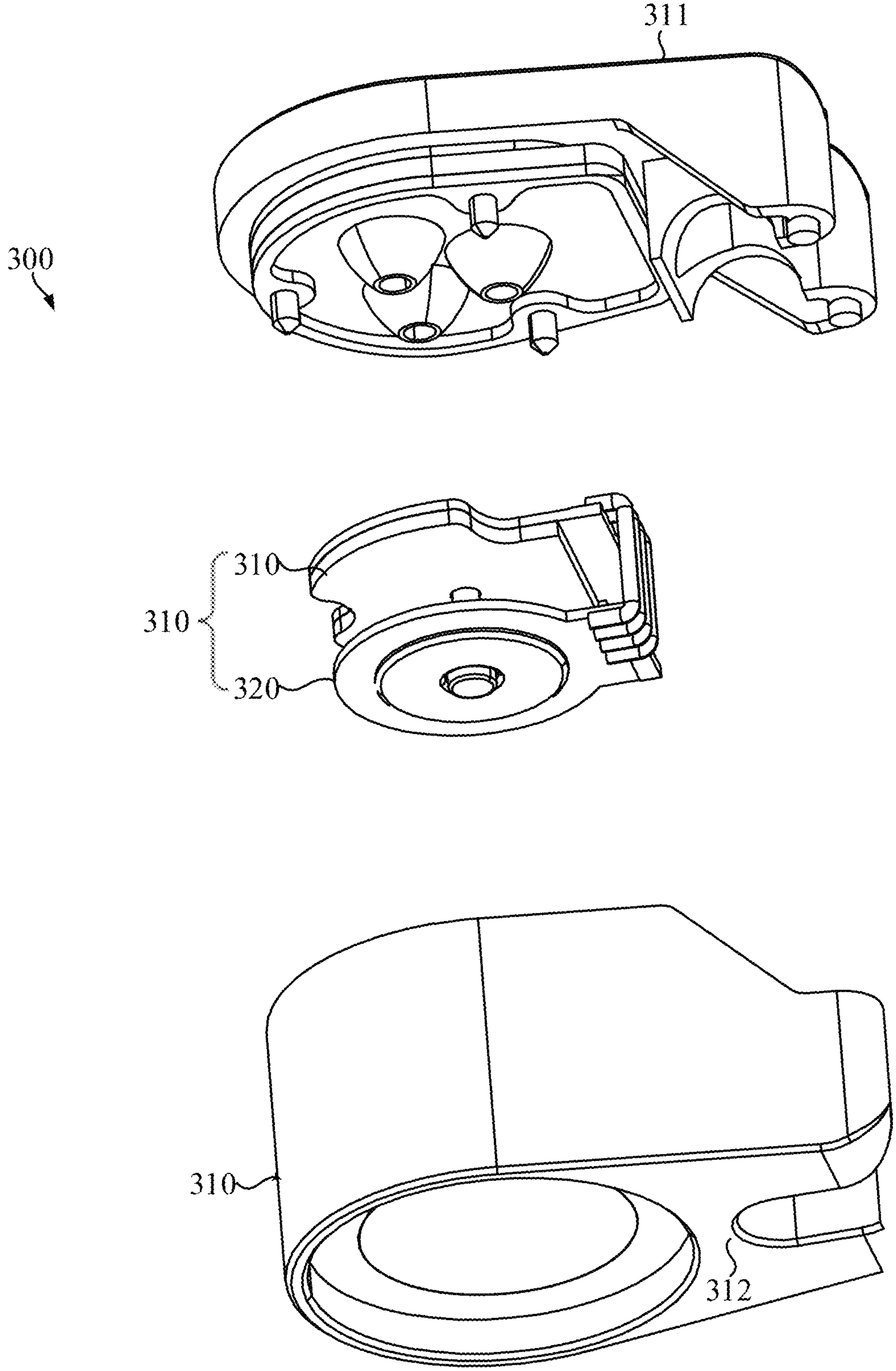
FIG. 11 is an exploded structural view of the lamp head shown in FIG. 9 from another perspective.

Preferably, in this embodiment, with reference to FIG. 10 and FIG. 11, the lamp housing 310 has a first end face 311 and a second end face 312 that are opposite to each other. The light source 320 includes a flood lamp 321 and a spot lamp 322, which are two illuminating lamps. The mounting groove 330 includes a first mounting groove 331 and a second mounting groove 332. The flood lamp 321 is disposed within the lamp housing 310, and the light from the flood lamp 321 is emitted through the first end face 311. The first mounting groove 331 is disposed on the first end face 311. The spot lamp 322 is disposed within the lamp housing 310, and the light from the spot lamp 322 is emitted through the second end face 312. The second mounting groove 332 is disposed on the second end face 312.

With reference to FIG. 5 and FIG. 10, when the lamp housing 310 clasps onto the bottom portion of the supporting end 101 and the bottom portions of the fixing ends 122 of the plurality of legs 120, the user relies on the circumferential rotation and pivoting movement of the lamp head 300 relative to the movable rod 200 to selectively orient either the first end face 311 or the second end face 312 towards the supporting end 101. Correspondingly, the plurality of fixing ends 122 can also be selectively fitted into either the first mounting groove 331 or the second mounting groove 332. Similarly, when the first end face 311 faces the supporting end 101, the plurality of fixing ends 122 are fitted into the first mounting groove 331. At this time, the second end face 312 is exposed, facing away from the first end face 311. The light from the flood lamp 321 is blocked and concealed by the bottom portion of the supporting end 101. The light from the spot lamp 322 is emitted through the exposed second end face 312, enabling the lighting apparatus 10 to achieve a spot lamp illumination function. When the second end face 312 faces the supporting end 101, the plurality of fixing ends 122 are fitted into the second mounting groove 332. At this time, the first end face 311 is exposed, facing away from the second end face 312. The light from the spot lamp 322 is blocked and concealed by the bottom portion of the supporting end 101. The light from the flood lamp 321 is emitted through the exposed first end face 311, enabling the lighting apparatus 10 to achieve a diffuse light illumination function.

It should be understood that, in other embodiments of the present application, firstly, in the present application, the number of the light source 320 and the mounting groove 330 is not limited. Specifically, the lamp head 300 is fixedly connected to the movable rod 200. The lamp housing 310 only has one side that clasps onto the supporting end 101. At this time, the mounting groove 330 is also correspondingly provided at only one location. The light source 320 is provided as one. The light from the light source 320 can still be selectively emitted from the first end face 311 and the second end face 312. Define the first end face 311 as being provided with the mounting groove 330 and clasping onto the supporting end 101. When the light from the light source 320 is emitted from the first end face 311, then when the lighting apparatus 10 is in the stowed state, the first end face 311, as the light-emitting surface, is concealed and protected, thereby protecting the light source 320. When the light from the light source 320 is emitted from the second end face 312, then when the lighting apparatus 10 is in the stowed state, the second end face 312, as the light-emitting surface, is exposed. At this time, the user can use the lighting apparatus 10 for illumination by holding it, thereby enabling the lighting apparatus 10 to function as a flashlight. Secondly, define the flood lamp 321 as the first illumination lamp and the spot lamp 322 as the second illumination lamp. The first illumination lamp and the second illumination lamp in this embodiment are two different functional types of illuminating lamps, achieving the illumination versatility of the lighting apparatus 10. However, in other embodiments, the first illumination lamp and the second illumination lamp can also be other functional types of illuminating lamps, or even the same functional type of illuminating lamp. The illumination function here is distinguished according to the luminous parameters of the illuminating lamp. The luminous parameters include but are not limited to at least one of luminous intensity, luminous flux, illuminance, luminance, luminous efficacy, and color temperature.

Preferably, in this embodiment, the bottom wall of the first mounting groove 331 and the second mounting groove 332 is formed of a light-transmissive material. Therefore, the light from the flood lamp 321 is emitted through the bottom wall of the first mounting groove 331, and the light from the spot lamp 322 is emitted through the bottom wall of the second mounting groove 332. It should be understood that, in other embodiments of the present application, under the circumstance that the bottom wall of the first mounting groove 331 and the second mounting groove 332 is not light-transmissive, the flood lamp 321 is directly embedded in and exposed from the first mounting groove 331, or the spot lamp 322 is directly embedded in and exposed from the second mounting groove 332. The light from the flood lamp 321 can also be emitted from the first end face 311, and the light from the spot lamp 322 can also be emitted from the second end face 312. That is, in the present application, whether the bottom wall of the first mounting groove 331 and the second mounting groove 332 is light-transmissive is not limited.

Figure 12:
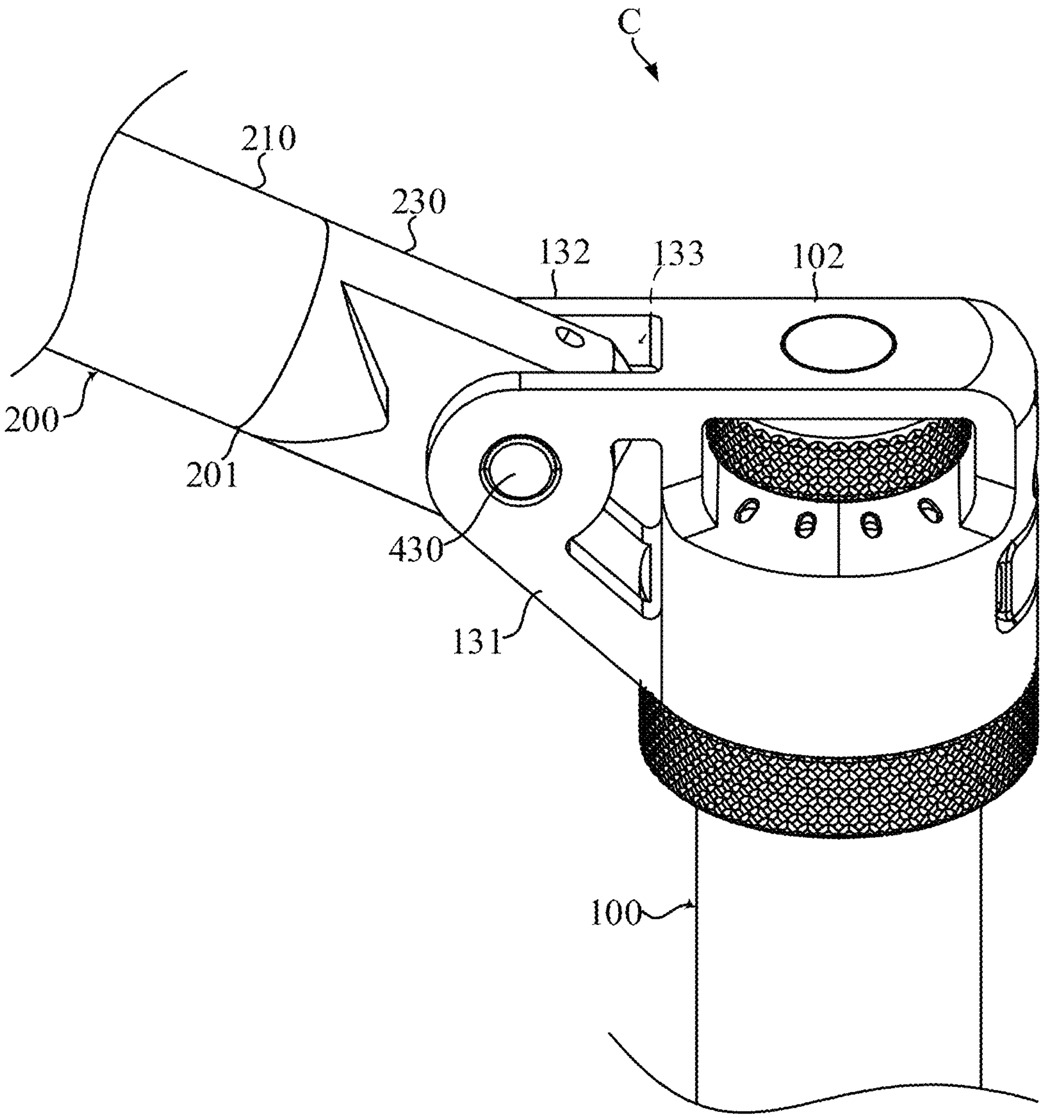
FIG. 12 is a partial enlarged structural view of portion C in the lighting apparatus of FIG. 3.
Figure 13:
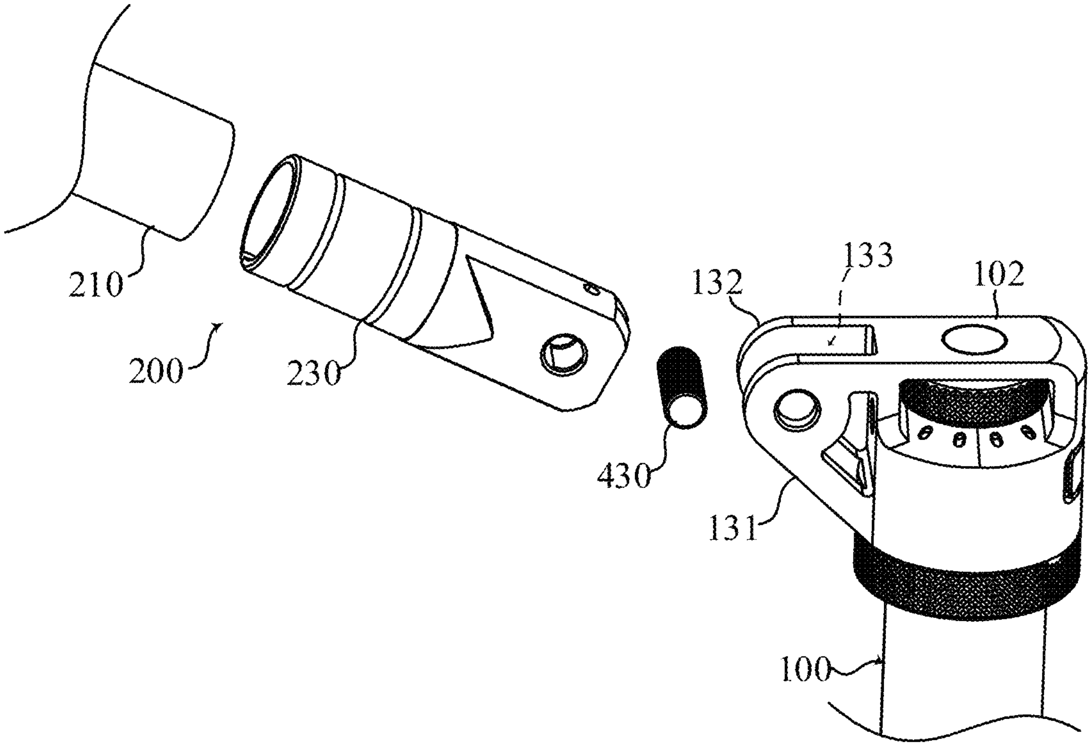
FIG. 13 is an exploded structural view of the connection between the movable rod and the support rod shown in FIG. 12.

Preferably, in this embodiment, with reference to FIG. 12 and FIG. 13, the movable rod 200 pivots relative to the support rod 100 about a third rotation axis 430. The first connecting end 201 is connected with an adapter 230. The adapter 230 is circumferentially limited with the fixed rod 210. The side periphery of the mounting end 102 protrudes to provide a first lug 131 and a second lug 132 that are spaced apart and opposite to each other. The third rotation axis 430 passes through the first lug 131, the adapter 230, and the second lug 132 in sequence along its axial direction, to achieve the pivotal connection of the first connecting end 201 and the mounting end 102. A clearance region 133 is formed between the first lug 131 and the second lug 132. When the first connecting end 201 pivots relative to the mounting end 102, the clearance region 133 allows for the pivoting movement of the adapter 230. To facilitate the connection, in this embodiment, one end of the adapter 230 is in the shape of a circular tube and is sleeved with the fixed rod 210. The other end of the adapter 230 is in a flat shape and is provided with an adapter hole for the third rotation axis 430 to pass through. It should be understood that, in other embodiments, the shape of the adapter 230 is not limited, provided that one end is connectable to the fixed rod 210 and the other end allows passage of the third rotation axis 430. It should be understood that the adapter 230 is pivotally connected to the first lug 131 and the second lug 132 via the third rotation axis 430, achieving the pivotal connection of the first connecting end 201 to the mounting end 102. In other embodiments, firstly, the adapter 230 can be connected to the mounting end 102. The first lug 131 and the second lug 132 can protrude from and be spaced apart on the side periphery of the first connecting end 201. The third rotation axis 430 can still pass through the first lug 131, the adapter 230, and the second lug 132 in sequence along its axial direction, to achieve the pivotal connection of the first connecting end 201 and the mounting end 102. Secondly, in other embodiments, even without providing the first lug 131, the adapter 230, and the second lug 132, by digging a groove or opening a hole in the mounting end 102 or the first connecting end 201, the third rotation axis 430 can pass through the first connecting end 201 and the mounting end 102, which can also achieve the pivotal connection of the first connecting end 201 to the mounting end 102, thereby enabling the pivoting of the movable rod 200 relative to the support rod 100. That is, in the present application, the pivotal connection method of the first connecting end 201 and the mounting end 102 is not limited.

Figure 14:
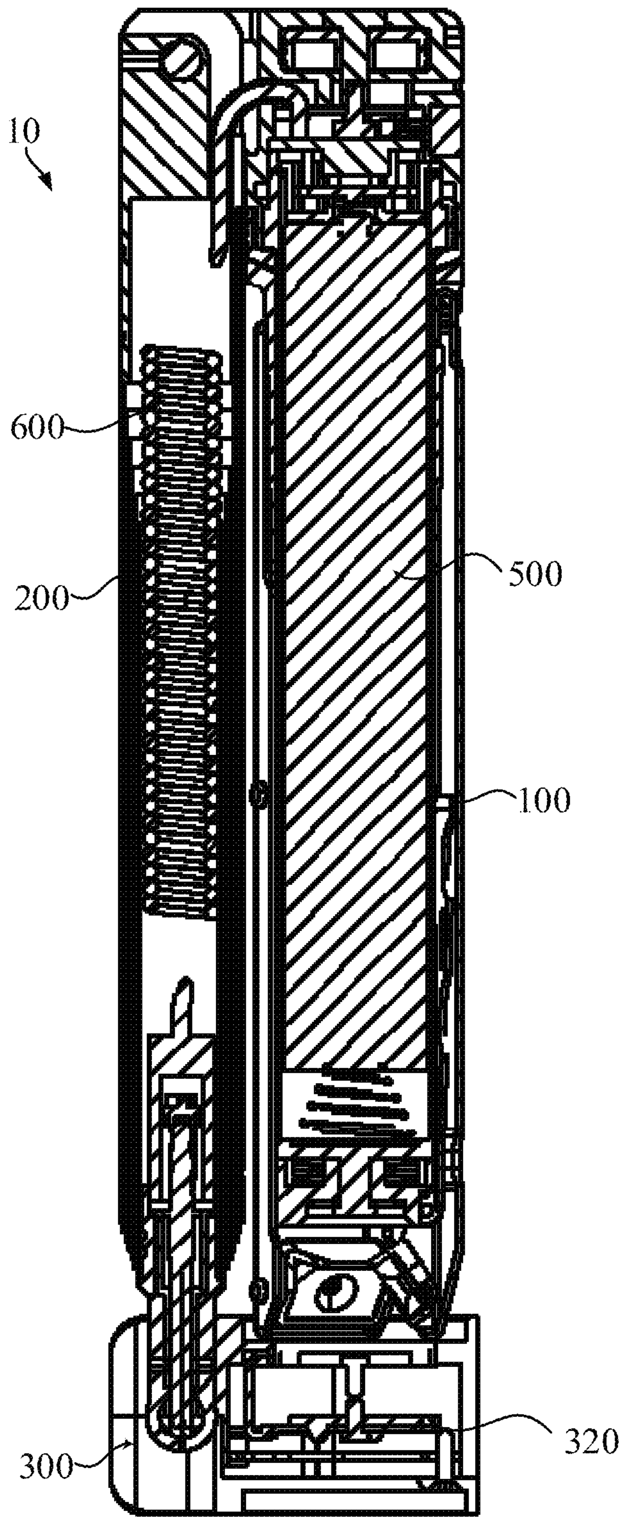
FIG. 14 is a cross-sectional structural view taken along the line A-A in FIG. 1.

Referring to FIG. 14, the lamp head 300 needs a power source for illumination. Therefore, the present application also includes a battery 500 and a conductive wire 600. The battery 500 provides power and is built into the support rod 100. The conductive wire 600 is built into the movable rod 200 and the support rod 100. The two ends of the conductive wire 600 are electrically connected to the light source 320 and the battery 500, respectively. Therefore, the light source 320 obtains electrical energy by being electrically connected to the battery 500 via the conductive wire 600, thereby realizing the illumination function. The design method of the light source 320 being electrically connected to the battery 500 via the conductive wire 600 provides uniform current transmission and good electrical contact. The battery 500 can be a dry cell battery, which needs to be replaced when its electrical energy is depleted. The battery 500 can also be a storage battery, which can be repeatedly used by being charged with an external power source. It should be understood that, in other embodiments, the light source 320 can be directly designed with a power supply element inside. At this time, the lighting apparatus 10 does not need to be additionally provided with the battery 500. The battery 500 can be directly disposed within the light source 320 and be in electrical contact with the light source 320 to achieve the supply of electrical energy to the light source 320. In this way, the lighting apparatus 10 does not need to be additionally provided with the conductive wire 600.

Although the present disclosure has been described with reference to several typical embodiments, it should be understood that the terminology used is illustrative and exemplary rather than restrictive. Since the present disclosure can be implemented in various forms without departing from its spirit or essence, it should be understood that the above-described embodiments are not limited by any foregoing details but should be broadly interpreted within the spirit and scope defined by the appended claims. Therefore, all changes and modifications falling within the scope of the claims or equivalents thereof should be covered by the appended claims.

What is claimed is:

1. A lighting apparatus, comprising:

a support rod having a mounting end and a supporting end that are axially opposite to each other;

a movable rod having a first connecting end and a second connecting end that are axially opposite to each other, wherein the first connecting end is pivotally connected to the mounting end, and when the first connecting end pivots relative to the mounting end, an included angle between the movable rod and the support rod changes, and the movable rod is pivotable to be side-by-side and adjacent to the support rod; and a lamp head connected to the second connecting end, the lamp head comprising a lamp housing and a light source connected to the lamp housing, wherein the lamp housing is configured to clasp onto the supporting end when the movable rod and the support rod are in a side-by-side and adjacent posture.

2. The lighting apparatus according to claim 1, wherein the movable rod comprises a fixed rod and a telescopic rod, wherein the first connecting end of the fixed rod is pivotally connected to the mounting end, the second connecting end of the telescopic rod is connected to the lamp housing, and the telescopic rod is telescopically sleeved with the fixed rod, enabling the movable rod to extend or retract; wherein when the movable rod and the support rod are in the side-by-side and adjacent posture, the lamp housing is configured to clasp onto a bottom portion of the supporting end by retracting the movable rod.

3. The lighting apparatus according to claim 2, wherein the support rod comprises a rod body and a plurality of legs, wherein two axially opposite ends of the rod body correspond to the supporting end and the mounting end, respectively; the legs have a pivoting end and a fixing end that are axially opposite to each other, wherein the pivoting end is pivotally connected to a side periphery of the rod body, and when the pivoting end pivots outwardly relative to the rod body, a plurality of the fixing ends are configured to switch from a retracted state wherein the fixing ends are positioned proximate to each other to a deployed state wherein the fixing ends are spaced apart from each other; and when the plurality of the fixing ends are in the retracted state, the lamp housing is configured to simultaneously clasp onto the bottom portion of the supporting end and bottom portions of the plurality of the fixing ends when the movable rod and the support rod are in the side-by-side and adjacent posture.

4. The lighting apparatus according to claim 3, wherein the lamp housing is provided with a mounting groove, wherein the bottom portions of the plurality of the fixing ends are configured to be simultaneously fitted into the mounting groove to be clasped with the lamp housing.

5. The lighting apparatus according to claim 3, wherein the fixing end of each of the legs is provided with a magnet, and the fixing end is configured to be magnetically attracted to the lamp head via the magnet.

6. The lighting apparatus according to claim 3, wherein the lamp housing is provided with a mounting groove, the fixing end of each of the legs is provided with a magnet, and the bottom portions of the plurality of the fixing ends are configured to be simultaneously fitted into the mounting groove to be clasped with the lamp housing, and simultaneously, the fixing end is magnetically attracted to the lamp head via the magnet.

7. The lighting apparatus according to claim 1, wherein the lamp head is pivotally connected to the second connecting end to achieve pivoting of the lamp head; wherein when the movable rod and the support rod are in the side-by-side and adjacent posture, the lamp housing is configured to clasp onto a bottom portion of the supporting end by pivoting the lamp head.

8. The lighting apparatus according to claim 7, wherein the support rod comprises a rod body and a plurality of legs, wherein two axially opposite ends of the rod body correspond to the supporting end and the mounting end, respectively; the legs have a pivoting end and a fixing end that are axially opposite to each other, wherein the pivoting end is pivotally connected to a side periphery of the rod body, and when the pivoting end pivots outwardly relative to the rod body, a plurality of the fixing ends are configured to switch from a retracted state wherein the fixing ends are positioned proximate to each other to a deployed state wherein the fixing ends are spaced apart from each other; and when the plurality of the fixing ends are in the retracted state, the lamp housing is configured to simultaneously clasp onto the bottom portion of the supporting end and bottom portions of the plurality of the fixing ends when the movable rod and the support rod are in the side-by-side and adjacent posture.

9. The lighting apparatus according to claim 8, wherein the lamp housing is provided with a mounting groove, wherein the bottom portions of the plurality of the fixing ends are configured to be simultaneously fitted into the mounting groove to be clasped with the lamp housing.

10. The lighting apparatus according to claim 8, wherein the fixing end of each of the legs is provided with a magnet, and the fixing end is configured to be magnetically attracted to the lamp head via the magnet.

11. The lighting apparatus according to claim 8, wherein the lamp housing is provided with a mounting groove, the fixing end of each of the legs is provided with a magnet, and the bottom portions of the plurality of the fixing ends are configured to be simultaneously fitted into the mounting groove to be clasped with the lamp housing, and simultaneously, the fixing end is magnetically attracted to the lamp head via the magnet.

12. The lighting apparatus according to claim 1, wherein the lamp housing is provided with a mounting groove, wherein a bottom portion of the supporting end is configured to be fitted into the mounting groove to be clasped with the lamp housing.

13. The lighting apparatus according to claim 1, wherein at the second connecting end, the lamp head is configured to rotate circumferentially about a first rotation axis, and to perform a pivoting movement about a second rotation axis, wherein the first rotation axis is parallel to an axis of the second connecting end and perpendicular to the second rotation axis; the lamp housing has a first end face and a second end face that are oppositely disposed; by means of the circumferential rotation and the pivoting movement of the lamp head, the lamp head is configured to clasp onto the supporting end, and the lamp housing is configured to selectively enable the first end face to clasp onto the supporting end, or enable the second end face to clasp onto the supporting end; the light source comprises a first illumination lamp, and light from the first illumination lamp is emitted through the first end face.

14. The lighting apparatus according to claim 13, wherein the light source further comprises a second illumination lamp disposed within the lamp housing, wherein light from the second illumination lamp is emitted through the second end face; wherein a luminous parameter of the first illumination lamp is different from a luminous parameter of the second illumination lamp, the luminous parameter comprising at least one of luminous intensity, luminous flux, illuminance, luminance, luminous efficacy, and color temperature.

15. The lighting apparatus according to claim 14, wherein the first illumination lamp is a spot lamp, and the second illumination lamp is a flood lamp.

16. The lighting apparatus according to claim 14, wherein the first end face and the second end face are both provided with a mounting groove, a bottom wall of the mounting groove is light-transmissive, and light from the first illumination lamp and light from the second illumination lamp are both emitted through the bottom wall of the mounting groove; and when the lamp housing clasps onto the supporting end, a bottom portion of the supporting end is fitted into the mounting groove.

17. The lighting apparatus according to claim 1, wherein the movable rod is further configured to rotate circumferentially about a central axis of the support rod, and wherein the movable rod, after being rotated circumferentially to an arbitrary angular orientation, is pivotable relative to the support rod to the side-by-side and adjacent posture, and the lamp head clasps onto the supporting end.

18. The lighting apparatus according to claim 1, wherein the movable rod is pivotable relative to the support rod about a third rotation axis; one of the first connecting end and the mounting end is connected with an adapter, and a side periphery of the other one of the first connecting end and the mounting end is provided with a first lug and a second lug that are spaced apart and opposite to each other, wherein the third rotation axis passes through the first lug, the adapter, and the second lug in sequence; a clearance region is formed between the first lug and the second lug, the clearance region allowing for pivoting of the adapter.

19. The lighting apparatus according to claim 1, wherein the lighting apparatus further comprises a battery and a conductive wire, the battery being disposed within the support rod, the conductive wire being disposed within the movable rod and the support rod, and the light source is electrically connected to the battery via the conductive wire.

20. The lighting apparatus according to claim 1, wherein the lamp head and the movable rod are detachably connected.

* * * * *